(12) United States Patent
Hara

(10) Patent No.: US 6,736,515 B2
(45) Date of Patent: May 18, 2004

(54) IMAGE DISPLAY DEVICE

(75) Inventor: Koichi Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/200,136

(22) Filed: Jul. 23, 2002

(65) Prior Publication Data

US 2003/0020883 A1 Jan. 30, 2003

(30) Foreign Application Priority Data

Jul. 25, 2001 (JP) ........................................ 2001-225060
Jul. 18, 2002 (JP) ........................................ 2002-209319

(51) Int. Cl.[7] ...................... G03B 21/00; G02F 1/1335; G02B 27/10
(52) U.S. Cl. ......................... 353/31; 349/95; 359/621
(58) Field of Search ................ 349/95, 57; 359/621; 353/122, 94, 31, 10, 99, 102, 7; 345/55, 7, 8

(56) References Cited

U.S. PATENT DOCUMENTS 5,666,226 A * 9/1997 Ezra et al. .................. 359/621
5,956,001 A * 9/1999 Sumida et al. ................ 345/55
6,104,446 A * 8/2000 Blankenbecler et al. ........ 349/5
6,407,724 B2 * 6/2002 Waldern et al. ................ 345/8

* cited by examiner

*Primary Examiner*—Russell Adams
*Assistant Examiner*—Melissa J Koval
(74) *Attorney, Agent, or Firm*—Fitzpatrick, Cella, Harper & Scinto (57) ABSTRACT

The present invention provides a reflection- or transmission-type liquid crystal display method enabling color synthesis without employing a dichroic prism or a polarizing beam splitter. Reflection-type display devices are formed on a reflective substrate. Each reflection type display device is composed of a barrier element consisting of a group of small liquid crystal shutters arranged two-dimensionally, microlens elements two-dimensionally arranged corresponding to the liquid crystal shutters, and a reflective surface of the reflective substrate, wherein the reflective surface is positioned on the focal plane of the microlenses. Parallel light beams of red, green and blue colors introduced obliquely respectively enter the reflection-type display devices exclusive for the respective colors and are mutually superposed on a plane distant from the display devices to achieve color synthesis. A projection lens is focused on the plane and projects an image on a screen provided in a distant position.

15 Claims, 11 Drawing Sheets

IMAGE DISPLAY DEVICE

BACKGROUND OF THE INVENTION

1. Field of the Invention

The present invention relates to an image display device and a projection-type image display apparatus.

2. Related Background Art

Figure 10:
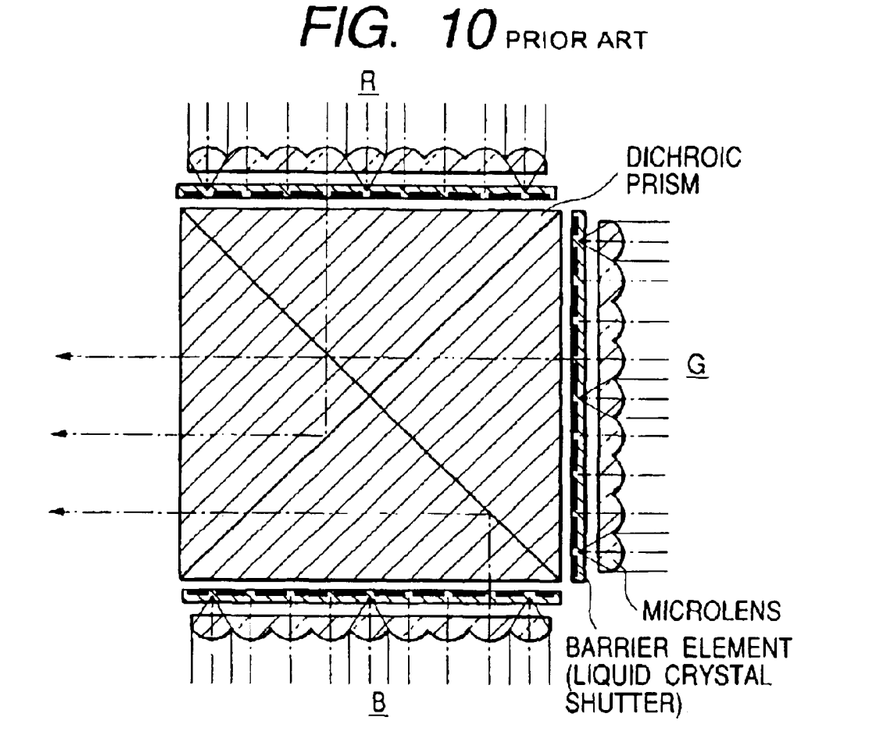
FIG. 10 is a view showing a conventional example of a three-panel transmission-type liquid crystal display device.

FIG. 10 shows a three-panel transmission-type liquid crystal display device. When using such a three-panel transmission-type display device, parallel light beams separated in three primary colors of R (red), G (green) and B (blue) perpendicularly enter into microlens elements provided on three faces of a dichroic prism to form light spots on the surface of a barrier element having liquid crystal shutters arranged on the focal position of the microlens elements, and each color light transmitted by the liquid crystal shutters for controlling the transmitted light amount corresponding to the position of the light spots is reflected or transmitted by the dichroic prism and emitted from the remaining face of the dichroic prism. The images of the respective colors are superposed by the dichroic prism, and an image is displayed on a screen by a projection lens focused on the aforementioned microlens element surfaces.

In FIG. 10, the projection lens is positioned between the screen and the dichroic prism and is focused on the surface of the microlenses.

Figure 11:
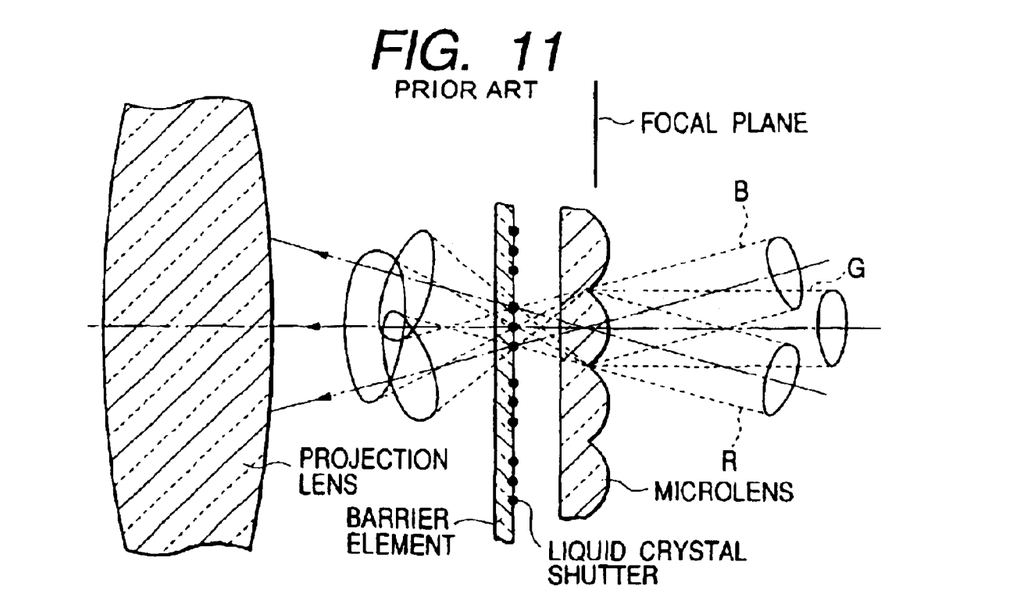
FIG. 11 is a view showing a conventional example of a single-panel transmission-type liquid crystal display device.

FIG. 11 shows a single-panel transmission-type liquid crystal display device. When using such a single-panel transmission-type liquid crystal display device, parallel light beams separated into three primary colors of R (red), G (green) and B (blue) are introduced with respective angles into a microlens element to form light spots in three different positions on the surface of a barrier element having a liquid crystal shutter on the focal position of the microlens element, and the lights of the primary colors transmitted by the liquid crystal shutters in three positions for controlling the transmitted light amount corresponding to the positions of the light spots are projected on a screen by a projection lens focused on the aforementioned microlens element surfaces to perform image display.

In FIG. 11, the projection lens is positioned between the screen and the barrier element and is focused on the surface of the microlenses.

Figure 12:
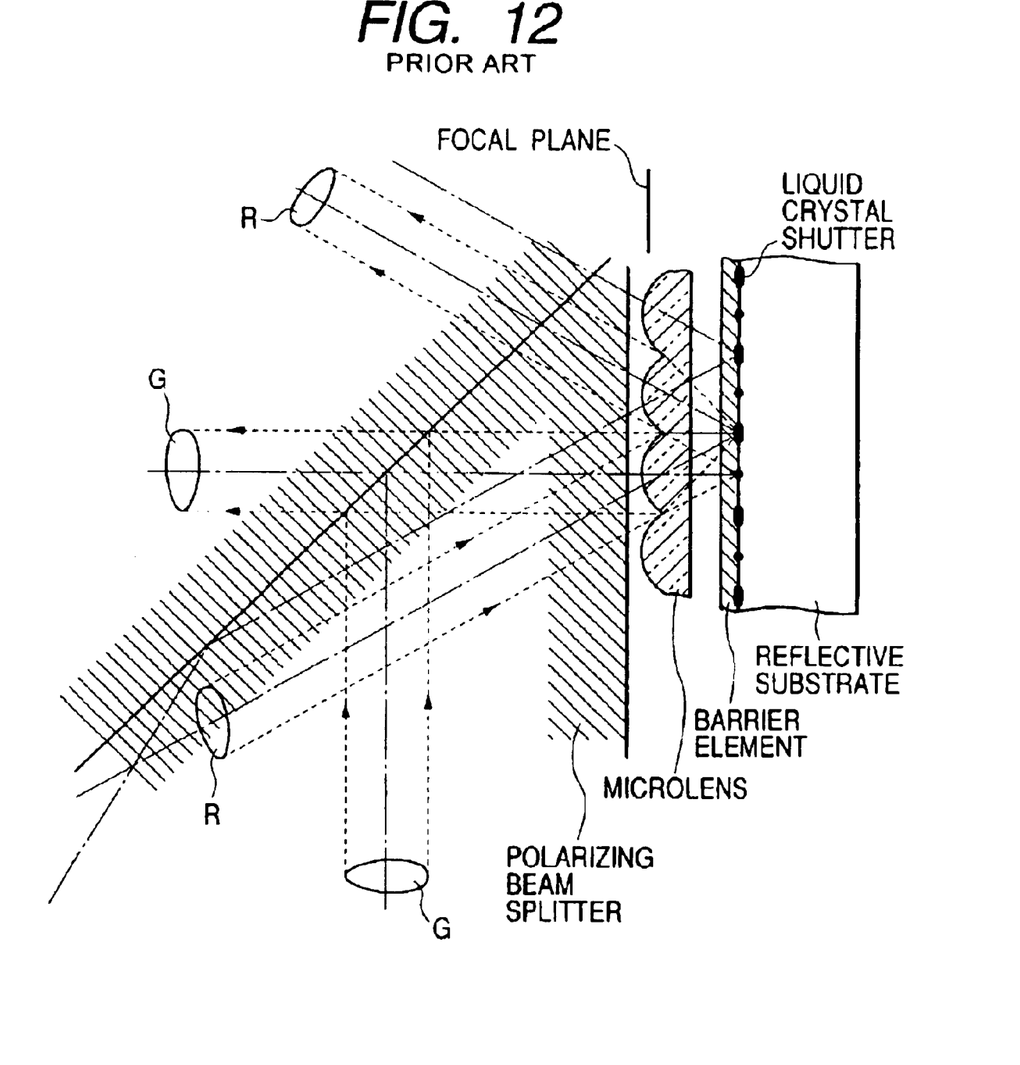
FIG. 12 is a view showing a conventional example of a single-panel reflection-type liquid crystal display device.

FIG. 12 shows a single-panel reflection-type liquid crystal display device. Parallel light beams of three primary colors of R, G, B are introduced with respective angles into the adjacent microlenses to form light spots of the microlenses on liquid crystal shutters for respective colors provided on a reflective substrate, and such spots reflect lights as new light-emitting points through the microlenses to display an image on a screen by a projection lens focused on the surface of the microlens element. In such a case, one of the R, G and B lights may be introduced, reflected and emitted perpendicularly to the microlenses. In the reflection-type display device, since each light beam is reflected in the direction of the incident light, a polarizing beam splitter must be employed in order to separate the entering light and the reflected light. Also, since the microlenses are arranged on the plane of a single panel, the boundary of each microlens has to be hexagonal or rectangular, and the hexagonal microlenses can only handle four colors at maximum including the case of perpendicular entry, while the rectangular microlenses can only handle six colors at maximum.

In FIG. 12, the projection lens is positioned between the screen and the polarizing beam splitter and is focused on the surface of the microlenses.

In such a single-panel-type configuration, it is required to form R, G and B pixels and liquid crystal shutters for controlling the brightness of the pixels while corresponding to each microlens. Consequently, complex wiring and complex correction of optical path length corresponding to the refractive index depending on the wavelength or the like is involved. More specifically, since R, G and B pixels are arranged in a mixed manner on a panel, the wiring connecting such pixels becomes complex. It is also required to form color filters constituting the R, G and B pixels in a mixed manner on the panel. Also such filters have to be formed with different thicknesses for different colors because of the difference in the refractive index depending on the wavelength.

SUMMARY OF THE INVENTION

In consideration of the foregoing, the present invention provides a transmission- or reflection-type image display device having the advantages of the three-panel configuration and the conventional single-panel configuration and a projection display apparatus utilizing such an image display device.

Also the present invention provides an image display device capable of easily realizing multicolor display with the single panel or stereo display method and a projection display apparatus utilizing such a device.

The present invention enables reflection- or transmission-type display capable of achieving color synthesis without a dichroic prism or a polarizing beam splitter.

In a system utilizing a dichroic prism or a polarizing beam splitter, the multicolor liquid crystal display can only be achieved with a plurality of polarizing beam splitters or a dichroic prism. As the prism has 6 faces one of which is used for emitting the synthesized colored light, the remaining 5 faces can be used for the primary R, G, B colors and two other colors. In this case, however, there are required a plurality of panels.

In the single-panel reflection-type configuration, since the primary colors have to be introduced at different angles, there can be utilized 3 primary colors when using rectangular microprisms or 4 primary colors when using hexagonal microprisms.

According to the present invention, therefore, there is provided an image display device comprising a microlens element having microlenses arranged in a two-dimensional matrix; illumination means having a group of small light-emitting points positioned at a predetermined distance respectively corresponding to the microlenses and arranged in a two-dimensional matrix; and a barrier element having shutters positioned between the microlens elements and the illumination means or at the side of the surface of the microlens element and adapted to control the light amount transmitted by the respective microlenses; wherein each optical axis connecting the microlens and the small light-emitting point is inclined to the normal line to the surface of the image display device over the entire image display device; and an image display consisting of a group of real images or false images of the small light-emitting points is formed in an infinite distance or in a position separated by a predetermined distance from the image display device and displaced laterally by a predetermined amount.

According to the present invention, there is also provided an image display device comprising a microlens element having microlenses arranged in a two-dimensional matrix; illumination means of a parallel beam for illuminating the microlens element from the rear side thereof; and a barrier element having shutters positioned between the microlens elements and the illumination means or at the surface at the light-emitting side of the microlens element and adapted to control the light amount transmitted by the respective microlenses; wherein each optical axis connecting the microlens and the small light-emitting point is inclined to the normal line to the surface of the image display device over the entire image display device; and an image display consisting of a group of real images or false images of the small light-emitting points is formed in an infinite distance or in a position separated by a predetermined distance from the image display device and laterally displaced in parallel manner by a predetermined amount therefrom.

DETAILED DESCRIPTION OF THE PREFERRED EMBODIMENTS

In the present invention, when employing transmission-type means, there are provided a first microlens element having microlenses arranged in a two-dimensional matrix, a barrier element positioned at the focal distance of the microlens element and having liquid crystal shutters corresponding to the microlenses, and small light-emitting points, wherein the optical axes connecting the small light-emitting points and the microlenses are made to entirely incline to form laterally shifted false or real images of the small light-emitting points at an infinite distance, and wherein similarly second and third microlens elements and a group of small light-emitting points are so arranged that the light beams emitted from these microlenses or the imaginary light beams, extended to a side opposite to the emitted direction of the emitted light beams, mutually cross on a plane, and an image is projected on a distant screen by a projection lens focused on such plane. The light beams from the respective microlens elements are of the three primary colors of R, G and B. Also image display means consisting of arrays of liquid crystal shutter elements are provided in positions intercepting the light beams transmitted by these microlenses to control the transmitted light amounts of the three primary colors to obtain a color image display.

Also when employing reflection-type means, the display means is composed of a first microlens element having microlenses arranged in a two-dimensional matrix and a reflective substrate positioned at the focal distance of the microlens elements, wherein the barrier element is formed on the reflective substrate. A parallel light beam is obliquely introduced into a microlens element, and a light spot formed by an adjacent microlens constitutes a light-emitting point from which the light is emitted through the adjacent microlens as a parallel light beam. An image is formed on a distant screen by a projection lens, focused on a plane, on which the parallel light beams of respective colors emitted from second and third microlens elements or imaginary light beams extended in the opposite direction to the emitted direction of such parallel light beams mutually cross. On the light spot, a liquid crystal shutter of the barrier element is provided to control the reflected light amount. In case the liquid crystal shutter is positioned at the surface side of the microlenses (i.e., opposite side to the reflective surface), a pixel can be constituted by two microlenses. More specifically, a parallel light beam obliquely entering from an adjacent microlens without the liquid crystal shutter is emitted through a microlens provided with the liquid crystal shutter, and a parallel light beam obliquely entering from a microlens provided with the liquid crystal shutter is emitted through a transmitted portion of an adjacent barrier element without the liquid crystal shutter.

The optical axes of the parallel light beams from these microlenses are assumed to be mutually parallel, but it is naturally possible also, instead of employing parallel optical axes, to superpose the light beams in a converging or diverging manner and to focus the projection lens on such a superposed plane, thereby achieving projection display on a distant screen.

Also in a reflection-type liquid crystal display device, it is not necessary to use a beam splitter because the plane of color synthesis is distant from the surface of the display device.

Also, since the color-separated images are formed in different (separate) positions, there can be easily inserted a thickness correction plate for wavelength correction, or the thickness of color filters can be easily changed in a collective manner, so that the correction of the focal distance or the like, required for the difference of the refractive index depending on the color wavelength, can be easily achieved. The same can be applied when light beams are parallel, converging or diverging.

The present invention will be explained in the following in more details.

In the first preferred embodiment of the present invention, a reflection-type display device is composed of a microlens element consisting of microlenses arranged in a two-dimensional matrix, a reflective substrate provided at the focal distance of the microlenses, and a barrier element having liquid crystal shutters arranged two-dimensionally corresponding to the microlenses and adapted to control the light amount transmitted by the microlenses, wherein the display devices for respective colors of R (red), G (green) and B (blue) are provided in three positions on the reflective substrate. Parallel light beams of respective colors are introduced into these display devices with respectively different angles from the outside. The reflected light beams, containing the image information of the respective colors, mutually overlap on a spatial plane distant from the surface of the reflective substrate. A projection lens is focused on such a plane to display an image on a distant screen.

In the preferred second embodiment of the present invention, a transmission-type display device is composed of a microlens element consisting of micro condenser lenses arranged in a two-dimensional matrix and a barrier element having liquid crystal shutters arranged two-dimensionally corresponding to the microlenses and at the focal distance of the microlenses and adapted to control the light amount transmitted by the microlenses, and the display devices for respective colors of R (red), G (green) and B (blue) are provided in three positions on a transparent substrate. Parallel light beams of respective colors are introduced into these display devices respectively with different angles from the back side. The converging light beams of the respective colors contain image information and mutually cross on a spatial plane distanced from the transparent substrate. A projection lens is focused on such a plane to display an image on a distant screen. The superposing position of the light beams is preferably displaced from the spot plane. An additional transparent substrate need not be provided, but the microlens element may be formed on the barrier element or vice versa.

In the preferred third embodiment of the present invention, a transmission-type display device is composed of a microlens element consisting of concave microlenses arranged in a two-dimensional matrix and a barrier element maintained in contact with the microlens element and provided with liquid crystal shutters arranged two-dimensionally corresponding to the microlenses and adapted to control the transmitted light amount of the microlenses, and the display devices for respective colors of R (red), G (green) and B (blue) are provided in three positions on a transparent substrate. Parallel light beams of respective colors are introduced into these display devices respectively with different angles from the back side. The extensions of the diverging light beams of the respective colors contain image information and mutually cross on an imaginary spatial plane distanced from the transparent substrate. A projection lens is focused on such a plane to display an image on a distant screen. The superposing position of the imaginary light beams is preferably displaced from the false image plane. An additional transparent substrate need not be provided, but the microlens element may be formed on the barrier element or vice versa.

EXAMPLE 1

Figure 1:
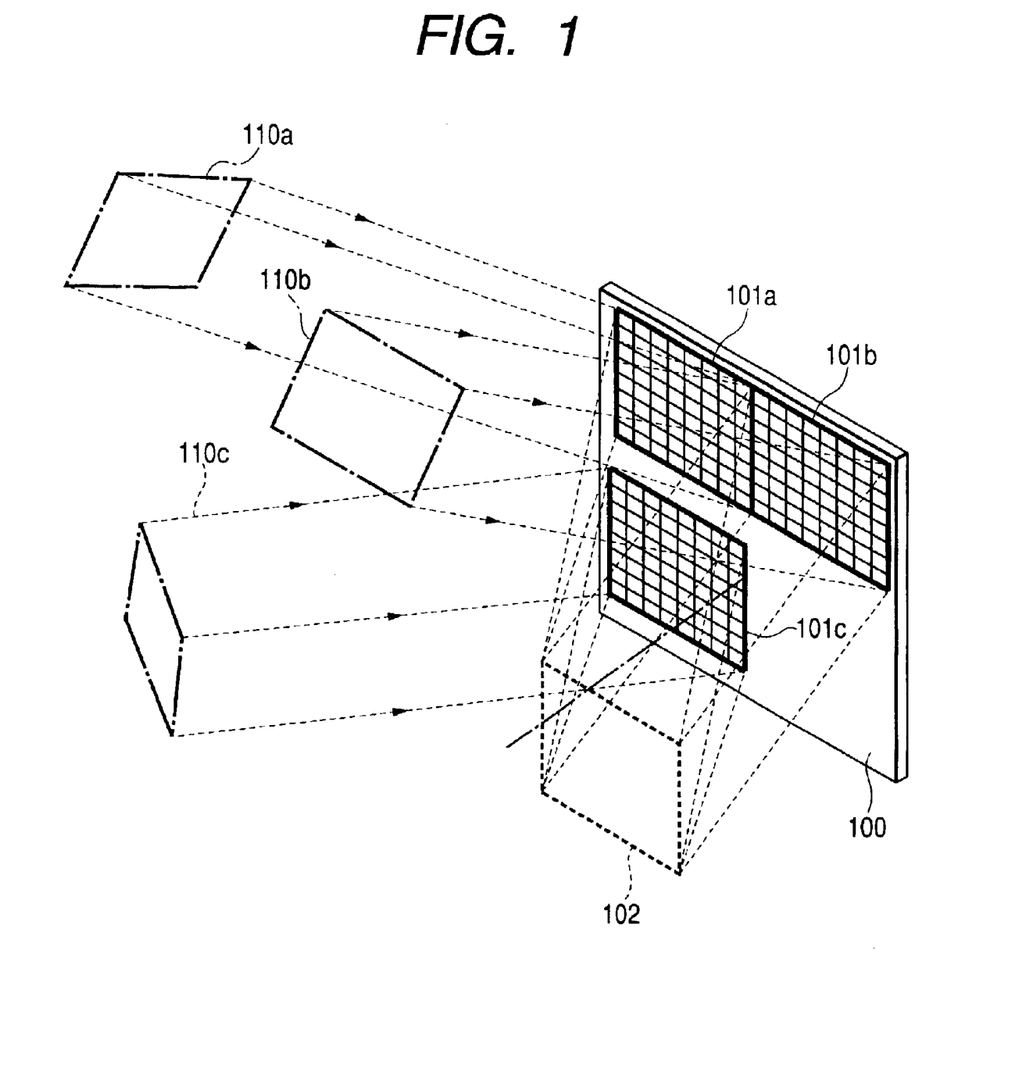
FIG. 1 is a view showing an example in which an image display element of the present invention is applied to a reflection-type display device.

FIG. 1 shows an example in which the present invention is applied to a reflection-type display device, wherein numeral 100 denotes a reflective substrate 100, and reflective display devices 101a, 101b and 101c are formed on one reflective substrate 100.

Figure 2A:
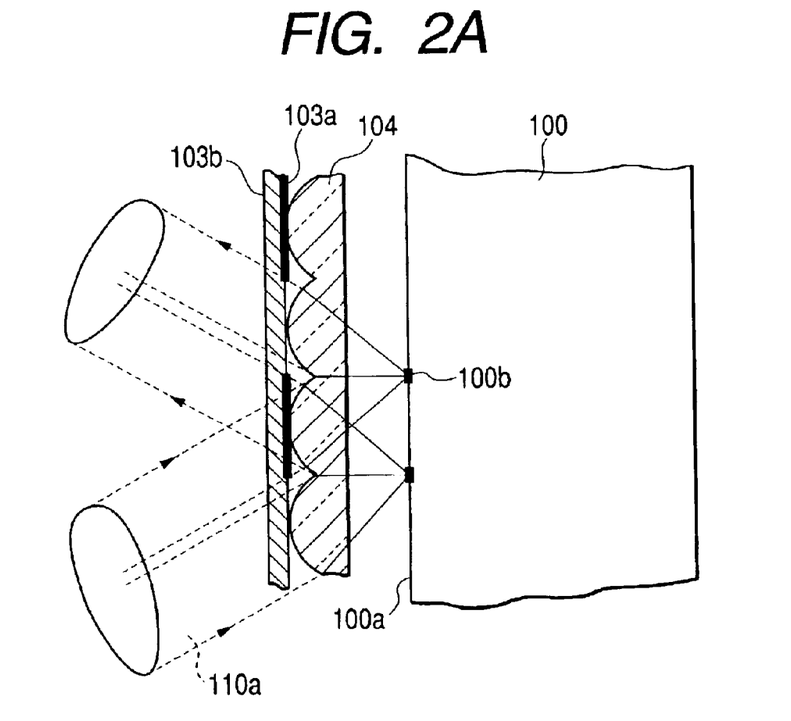
FIGS. 2A and 2B are cross-sectional views showing the configuration of the reflection-type display device of Example 1.
Figure 2B:
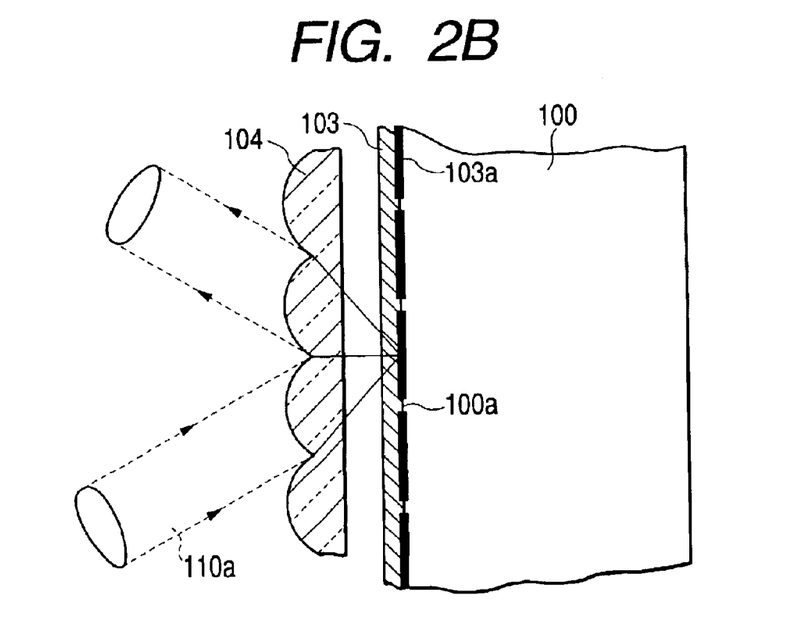

As shown in FIGS. 2A and 2B, each of the reflection-type display devices 101a, 101b and 101c is composed of a barrier element 103 consisting of a group of small liquid crystal shutters arranged two-dimensionally, a microlens element 104 consisting of microlenses arranged two-dimensionally respectively corresponding to the liquid crystal shutters, and a reflective surface 100a of the reflective substrate, and the reflective surface is positioned on the focal plane of the microlenses. In the present example, the barrier element is a liquid crystal element (light valve) consisting of a plurality of pixels, each consisting of opposed electrodes and liquid crystal provided therebetween, on the same plane.

Parallel light beams 110a, 110b and 110c of R (red), G (green) and B (blue) entering obliquely are introduced respectively into the reflection-type display devices for the respective colors, and the reflected parallel light beams are mutually superposed on a plane 102 distanced from the display devices, thereby achieving color synthesis on such plane.

A projection lens (not shown in the drawings) is focused on the aforementioned plane 102, fetches the reflected light beams and projects an image on a screen in a distant position. The projection lens 120 is provided between the plane 102 of color synthesis and the screen plane (not shown in the drawings).

Referring to FIG. 1, the projection lens is positioned between the screen and the plane 102 and is focused on the plane 102.

The number of reflection-type display devices can naturally be increased within spatial limitations. For example, when a display close to solar light is desired, it is desirable to increase the number of colors. In such a case, the number of the reflection type display device can be increased. When the microlenses are rectangularly arranged (stereoscopic observation is desired with an increased number of colors), the microlenses may be arranged in diagonal manner.

EXAMPLE 2

FIGS. 2A and 2B are cross-sectional views showing the configuration of the reflection-type display device of Example 1, wherein numeral 100 denotes a reflective substrate 100, 100a denotes a reflective surface of the reflective substrate, 103b denotes a transmission-type barrier element 103b which is transparent except for the liquid crystal shutter portions, 104 denotes a microlens element, and 103a denotes a micro liquid crystal shutter capable of controlling the transmitted light amount and thereby forming an image. The transmission-type barrier element 103b alternately has a transparent portion and a liquid crystal shutter portion for every two microlenses.

In a configuration shown in FIG. 2A, the transmission-type barrier element 103b is provided on the front side (i.e., a side opposite to the reflective surface 100a) of the microlens element 104. In this configuration, one liquid crystal shutter 103a corresponds to two microlenses.

A parallel light beam 110a of a color obliquely entering through an adjacent microlens forms a light spot on the reflective surface 110a. Such a light spot constitutes a small light-emitting point 100b, and the light is reflected and emitted through a microlens. In this operation, the transmitted light amount is controlled by the liquid crystal shutter. A light beam entering this liquid crystal shutter 103a is similarly emitted through an adjacent transparent portion of the barrier element 103b.

On the other hand, a light beam among the parallel light beam 110a entering the microlenses through a portion without the liquid crystal shutter 103a is condensed by a microlens (adjacent to a microlens corresponding to such portion with the liquid crystal shutter 103a) to form another small light-emitting point adjacent to the small light-emitting point indicated by 100b. Then the light reflected from such small light-emitting point is transmitted by the aforementioned liquid crystal shutter 103a and is emitted from the barrier element 103b.

FIG. 2B shows another configuration of applying the present invention to a conventional reflection-type liquid crystal display device. A major difference lies in that the liquid crystal shutter 103a is relieved from the limitation in size and can be formed wider. Conventionally three liquid crystal shutters for R, G and B colors have to be formed corresponding to a microlens; this has been a significant limitation in designing and manufacture.

In such a configuration, the liquid crystal shutter 103b can be formed wider, but the configuration employing three reflective substrates 100 for three colors can be conceived to increase the dimension of the entire device in comparison with the configuration shown in FIG. 11. However, the conventional device requires a triple size for forming a pixel with R, G and B colors (for the same number of pixels and the same area for a pixel). Thus, the total area remains the same.

The reflection takes place in the entire area both in the cases of FIGS. 2A and 2B, but, because of the presence or absence of the boundary of the microlenses, the configuration shown in FIG. 2B is more efficient.

In FIGS. 2A and 2B, the projection lens is positioned between the screen and the microlens element 104 and is focused on the surface of the microlens element 104.

EXAMPLE 3

Figure 3:
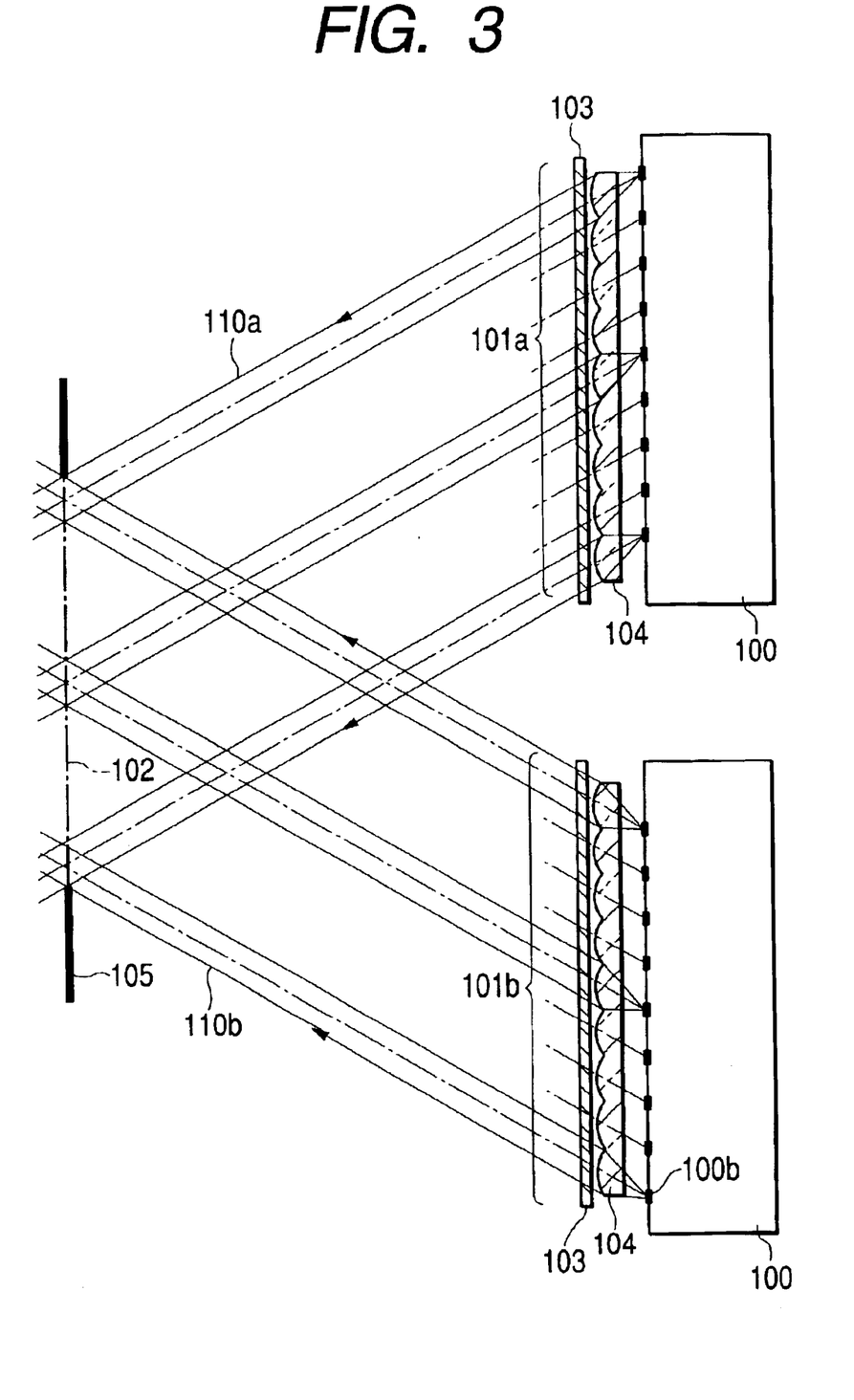
FIG. 3 is a view showing the principle of color synthesis in Example 1.

FIG. 3 shows the principle of color synthesis in Example 1. Parallel light beams 110a and 110b emitted from the display devices execute color synthesis on a plane 102 in a distant position. A diaphragm 105 is provided for cutting the stray light.

The projection lens is focused on such a plane to project an image on a screen in a distant position.

Small light-emitting points 100b are formed on the reflective surface 100a.

In case of a reflection-type display device, such small light-emitting points 100b are formed by microlenses, but, in the application to a transmission-type display device, they may be formed by micro condenser lenses 104a of which optical axes are aligned with the microlenses.

In FIG. 3, the projection lens is positioned between the screen and the plane 102 of color synthesis and is focused on the plane 102.

EXAMPLE 4

Figure 4:
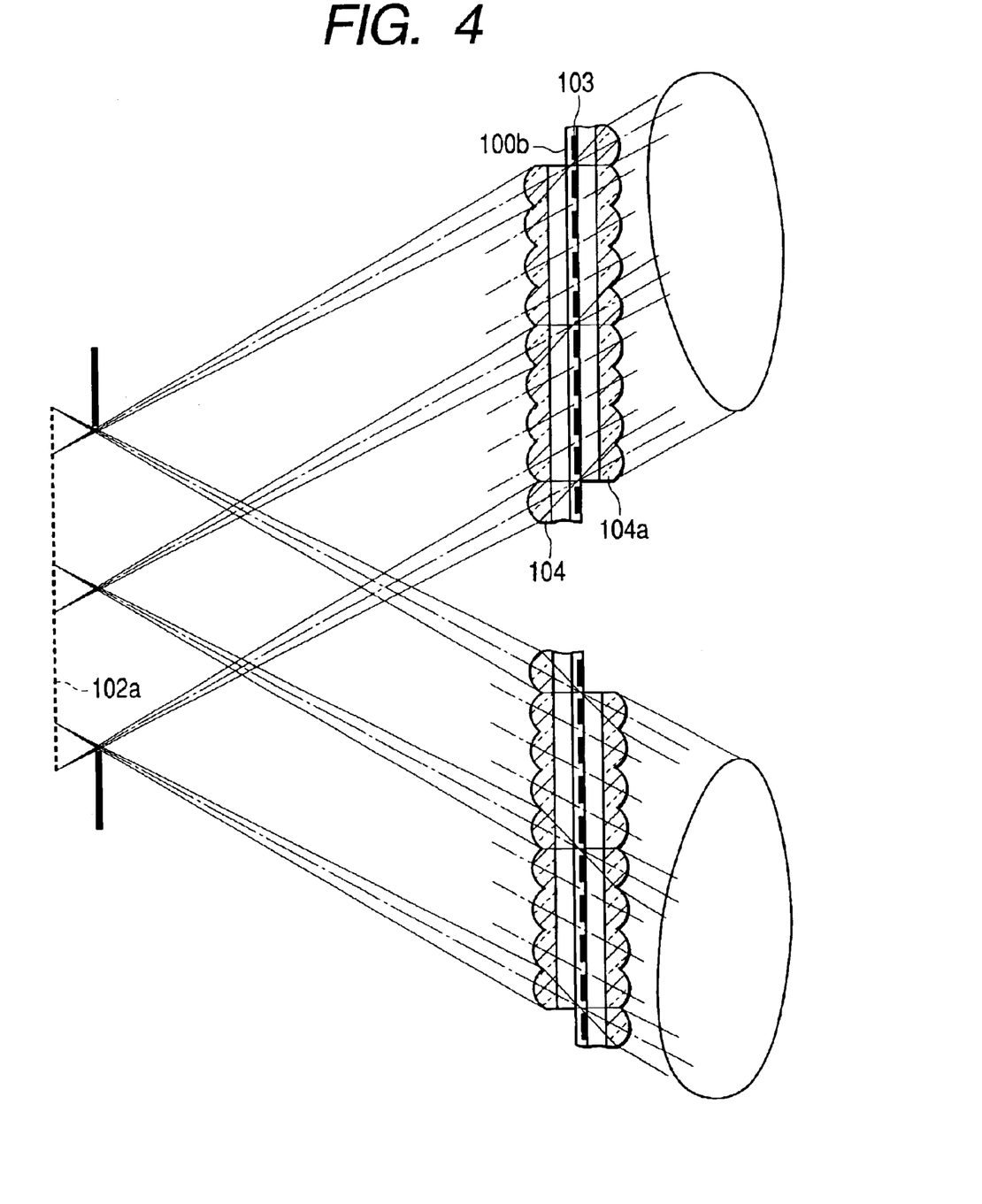
FIG. 4 is a view showing an example employing micro condenser lenses.

FIG. 4 shows an example utilizing micro condenser lenses 104a. A microlens element 104, having optical axes aligned with those of the micro condenser lenses, is employed to increase the light condensing efficiency. The light proceeds from the right side of FIG. 4 in the order of 104a, 103 and 104 to 102a at the left side.

In the present example, small light-emitting points 100b (aperture portions of a liquid crystal shutter plane 103b of a barrier element 103) are formed on the liquid crystal shutter plane of the barrier element 103. Since these small light-emitting points constitute real images of the light-emitting portion of an illuminating lamp (not shown in the drawings), the projection lens 120 is focused on a plane displaced from the projected real images 102a of the small light-emitting points.

In FIG. 4, the projection lens is positioned between the screen and the color synthesized real image 102a and is focused on the plane 102a of the real image.

EXAMPLE 5

Figure 5:
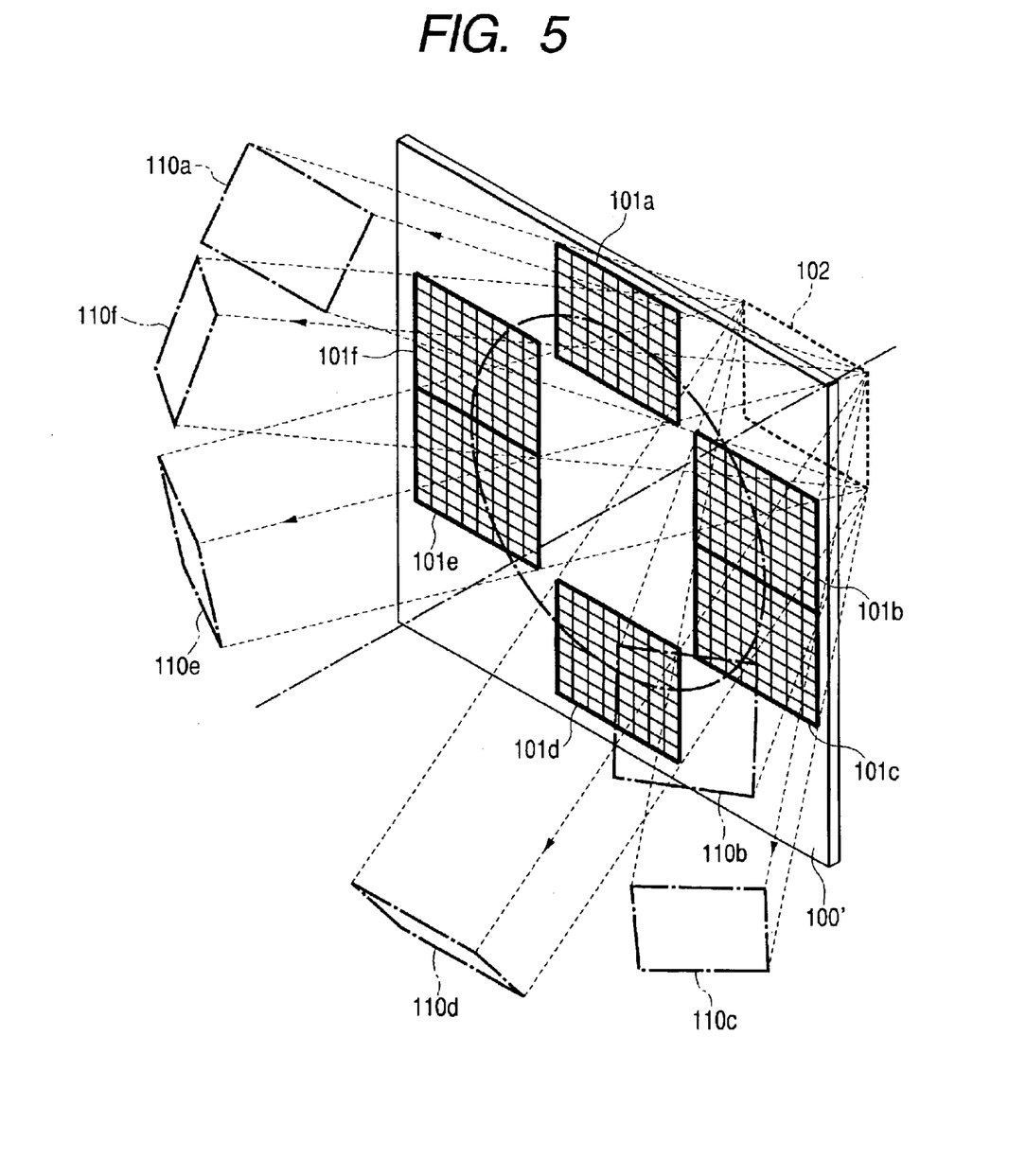
FIG. 5 is a view showing an example in which an image display element of the present invention is applied to a transmission-type display device.

FIG. 5 shows an example in which the present invention is applied to a transmission-type display device, wherein numeral 100 denotes a display substrate, display devices 101a to 101f formed on the display substrate and having centers positioned concentrically. A light source is provided at the right side of the drawing, while a screen is provided at the left side of the drawing, and a projection lens is focused onto a plane 102.

The concentric arrangement is adopted because the coaxial relationship with a projection lens (not shown in the drawings) is easy to achieve, and the focal distances of the microlens elements are easy to match. When forming the microlenses of the same condition on a single substrate, it becomes easy to correct the differences among the groups 101a to 101f. On the other hand, the fluctuations within the group 101a cannot be corrected.

Numeral 102 denotes a plane where light beams from the respective display devices mutually superpose, on which the projection is focused, to achieve color synthesis with six colors, closer to the natural color than with three primary colors. The devices 110a to 110f are observed as if emitted from the plane 102.

It is also possible to execute a first image display of R, G and B with the devices 101a to 101c and a second image display with the devices 101d to 101f.

A stereoscopic image can be obtained by using the first image for an image for the right eye and the second image for an image for the left eye, projecting these images through the projection lens 120 with mutually perpendicularly polarized lights (for example, by passing either image through a ½ wavelength plate), and observing the projected image on the screen with eyeglasses consisting of polarizing filters mutually perpendicular to the right eye and the left eye. Naturally, the number of display devices can be increased within the available space.

In FIG. 5, the projection lens is positioned between the screen and the substrate 100 and is focused on the plane 102.

EXAMPLE 6

Figure 6:
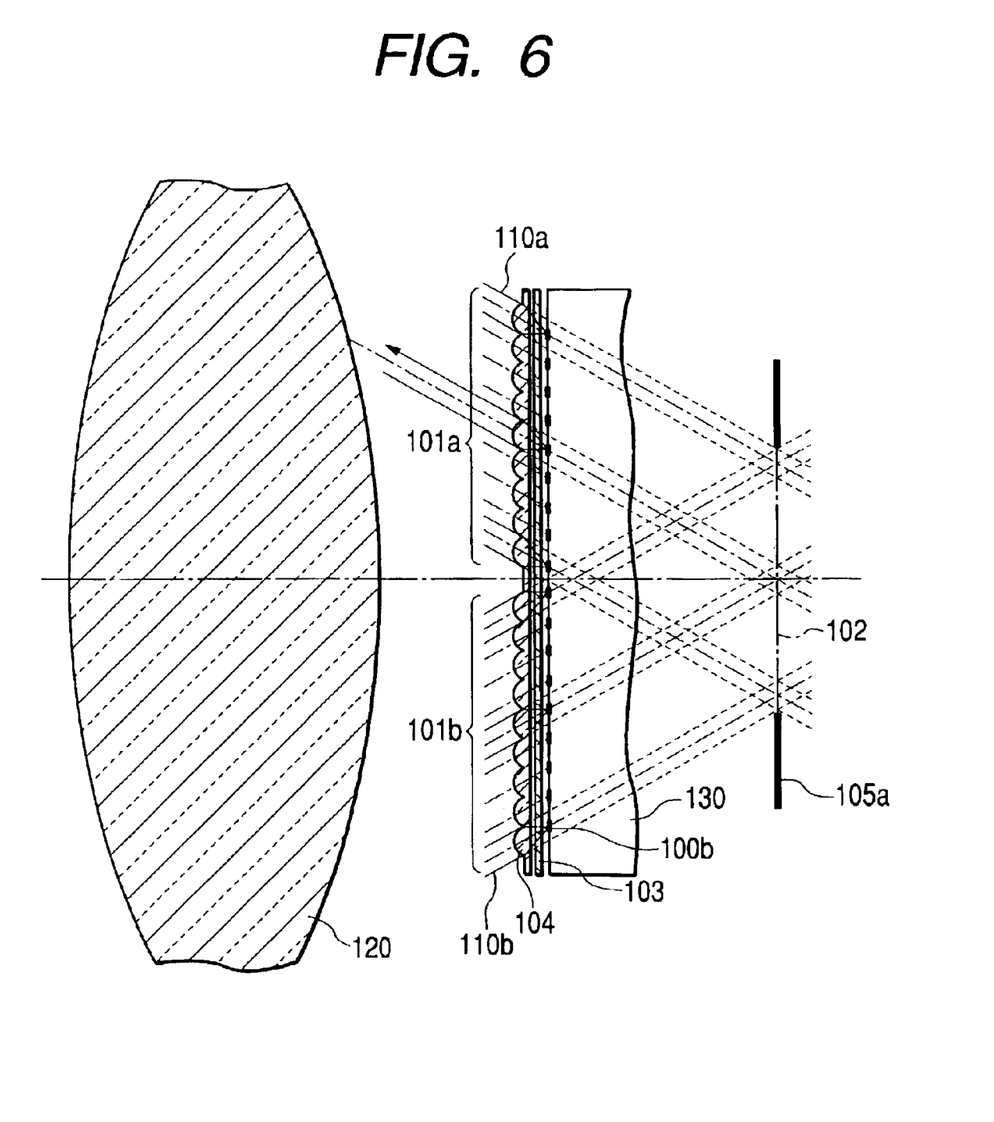
FIG. 6 is a cross-sectional view showing the principle of Example 5.

FIG. 6 is a cross-sectional view showing the principle of Example 5. The small light-emitting points 100b are positioned at the focal distance of the microlenses 104, and parallel light beams 101a and 101b are emitted at angles different for the respective display devices and mutually superpose on a plane 102 in a direction opposite to the emitted directions of the parallel light beams.

An illumination system 130 creates the small light-emitting points 100b and is usually composed of an optical system employing a lamp of a high luminance.

A projection lens 120 is focused on the plane 102. A diaphragm 105a is provided in order to form a black image frame in the projection on the screen.

EXAMPLE 7

Figure 7:
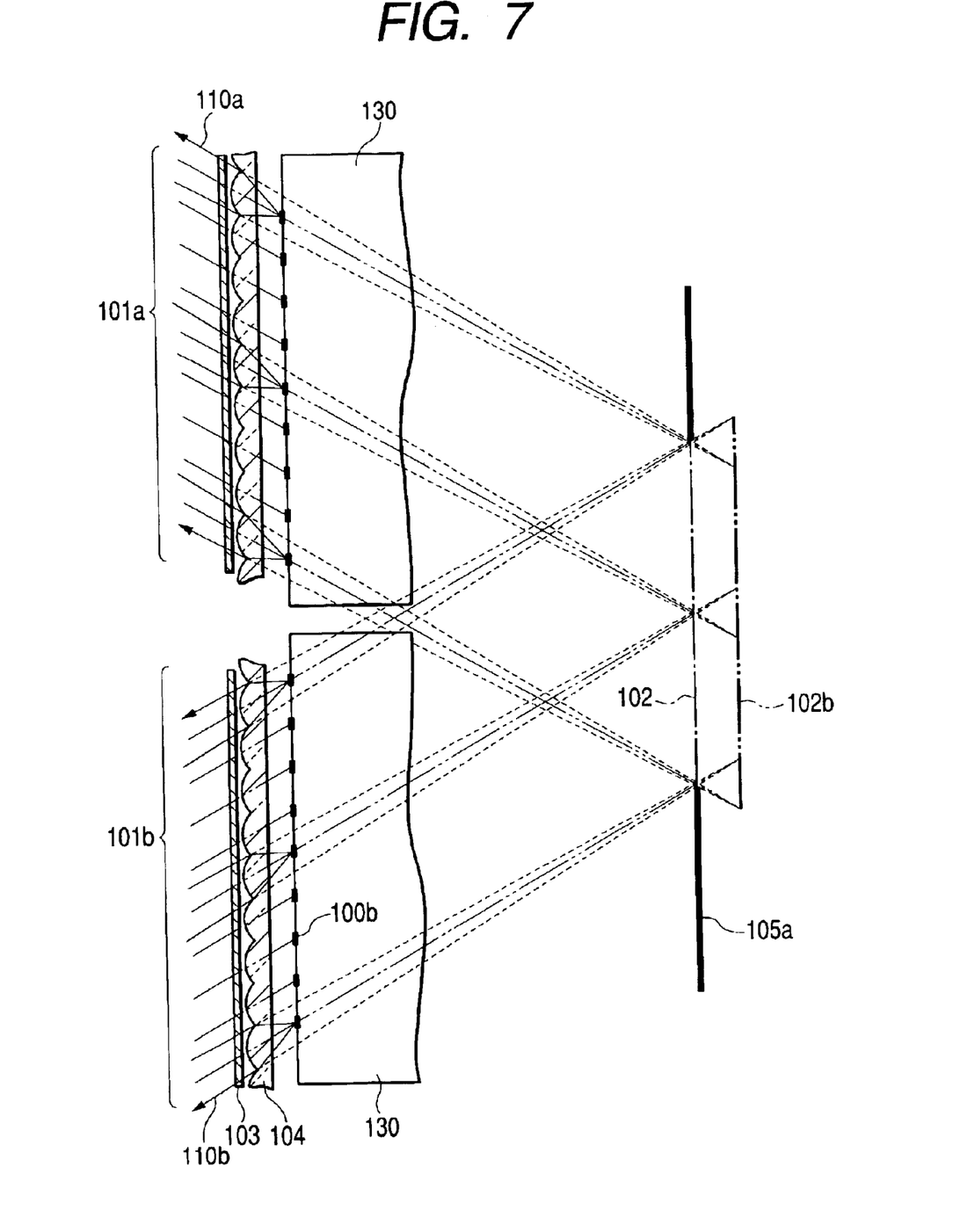
FIG. 7 is a view showing an example in which the diverging light beam forms false images of small light-emitting points at a finite distance.

FIG. 7 shows an example in which diverging light beams 110a and 110b form false images 102b of the small light-emitting points 100b at a finite distance. In this case, imaginary light beams extended in a direction opposite to the emitted direction of the diverging light beams mutually cross on a plane 102 different from the false image plane.

The projection lens 120 is focused on the plane 102. An illuminating optical system 130 creates the small light-emitting points for the respective color.

In FIG. 7, the projection lens is positioned between the screen and the small light emitting points 103 and is focused on the plane 102b.

EXAMPLE 8

Figure 8:
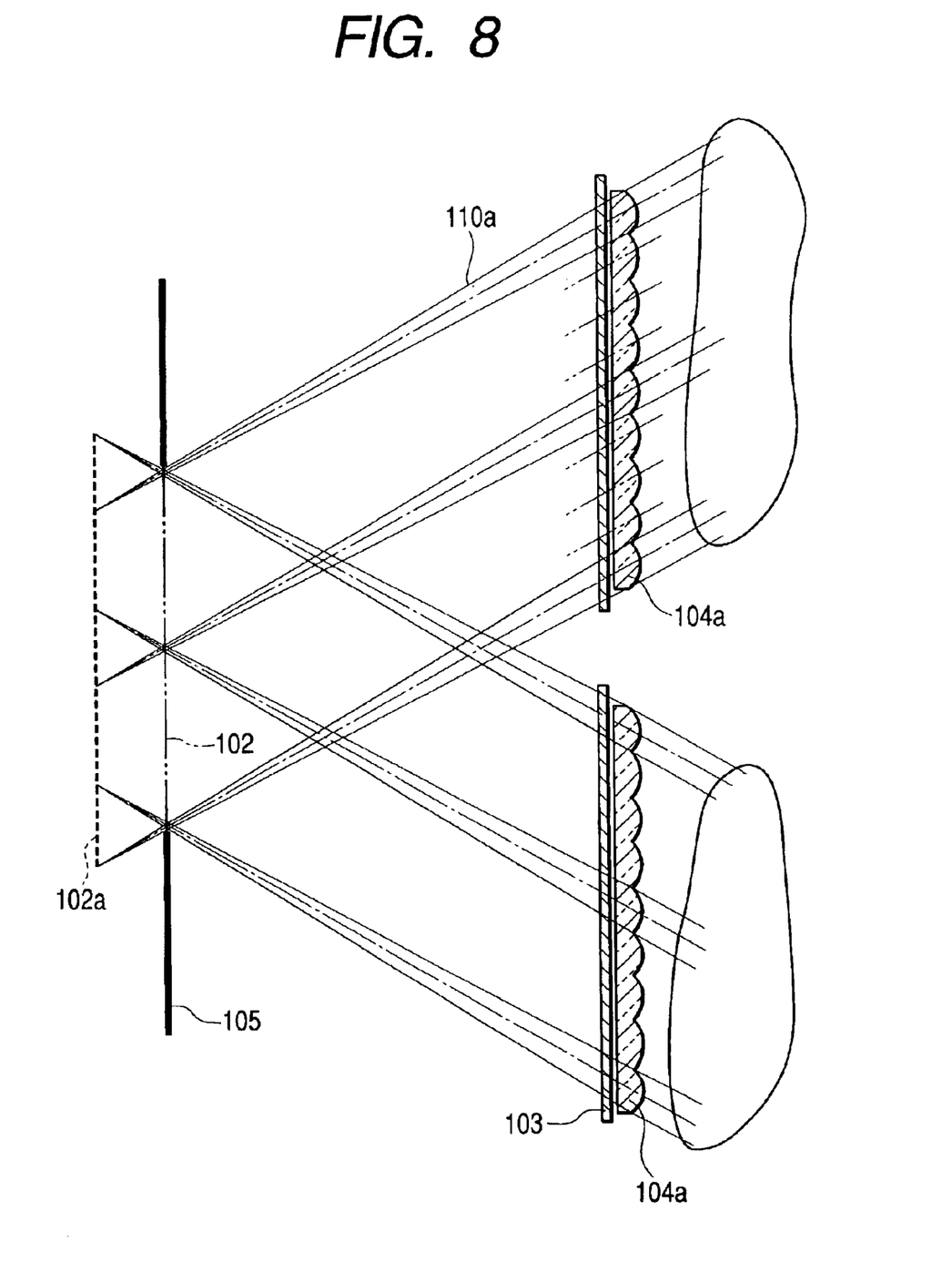
FIG. 8 is a view showing an example in which images of the light sources are formed by micro condenser lenses.

FIG. 8 shows an example in which an image 102a of a light source is formed with micro condenser lenses 104a.

Parallel light beams 110a and 110b of mutually different colors, entering with different angles, are condensed by micro condenser lenses to form spots in a distant position 102a.

The condensed light beams of the respective colors mutually cross on a plane 102. A projection lens 120 is focused on this plane 102 and projects an image on a screen in a distant position. A diaphragm 105 is provided for forming an image frame.

In FIG. 8, the projection lens is positioned between the screen and the plane 102a and is focused on the plane 102a.

EXAMPLE 9

Figure 9:
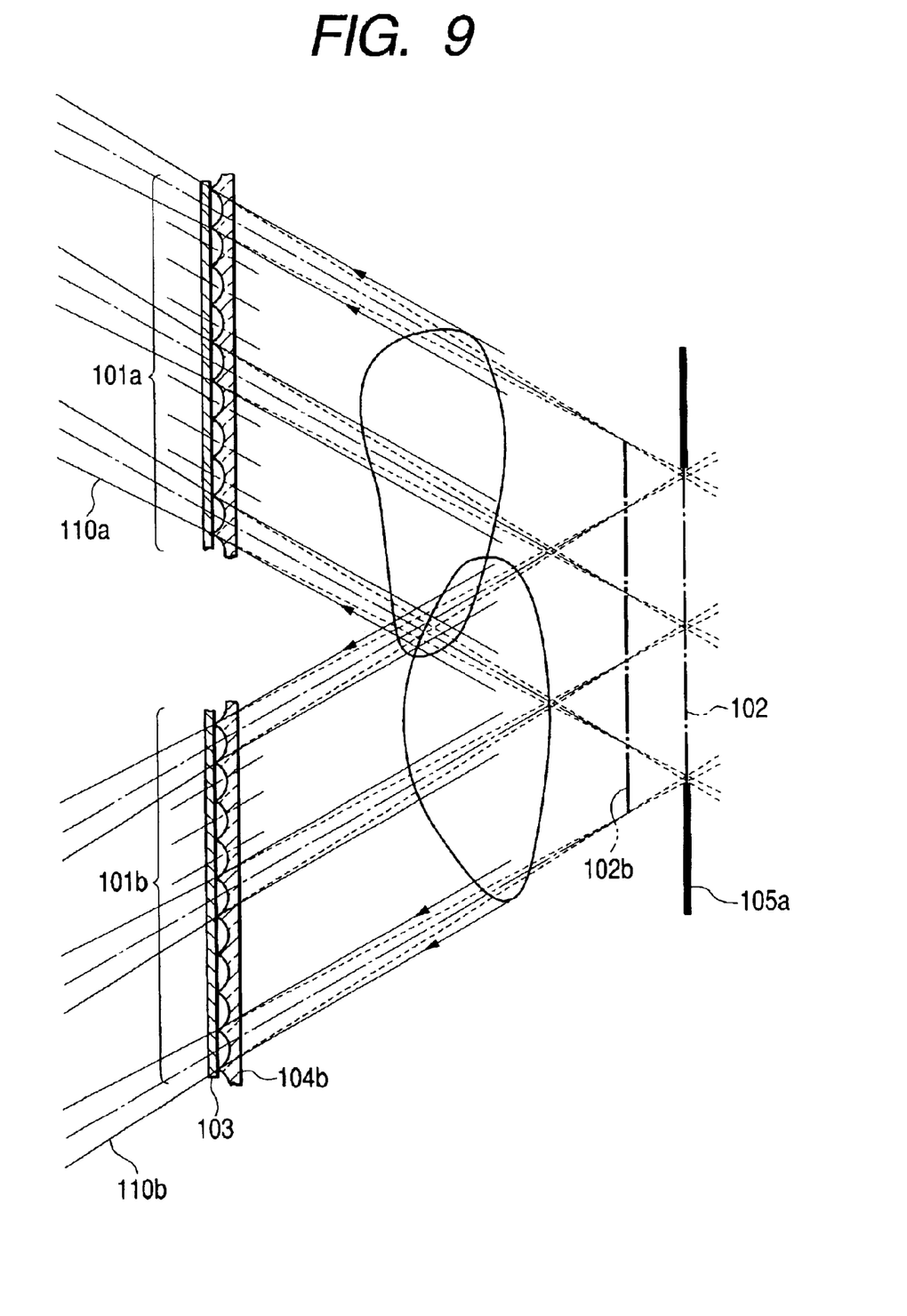
FIG. 9 is a view showing an example in which false images are formed with micro concave lenses.

FIG. 9 shows an example in which parallel light beams of mutually different colors are introduced into a concave microlens element 104 to form a false image. Diverging light beams 110a and 110b form false images 102b of parallel beams at a finite distance. In this case, imaginary light beams extended in a direction opposite to the emitted direction of the diverging light beams mutually cross on a plane 102 different from the false image plane 102b. A projection lens 120 is focused on the plane 102.

In FIG. 9, the projection lens is positioned between the screen and the barrier clement 103 and is focused on the plane 102b.

As explained in the foregoing, the present invention provides a transmission- or reflection-type single panel liquid crystal display device, a projection display apparatus utilizing such a display device, and a reflection- or transmission-type liquid crystal display method of enabling color synthesis without requiring a dichroic prism or a polarizing beam splitter.

Also according to the present invention, there is enabled natural image display with a number of colors greater than the three primary colors or stereoscopic image display, by forming a plurality of barrier elements, each having liquid crystal shutters arranged two-dimensionally to represent a display image, in different positions on a substrate and synthesizing an image from the images of these barrier elements by means of microlenses in a spatial position distant from the surface of the substrate and laterally displaced from these barrier elements. The use of such microlenses allows the lateral shift and superposition, in the space, of the image information of the respective constituent colors, positioned in a plurality on a plane, thereby increasing freedom in constructing projection display apparatuses.

What is claimed is:

1. An image display device comprising:
    a microlens element having microlenses arranged in a two-dimensional matrix;
    illumination means having a group of small light-emitting points arranged in a two-dimensional matrix and provided at a predetermined distance respectively corresponding to the microlenses; and
    a barrier element provided between the microlens element and the illumination means or at a surface of the microlens element and having shutters arranged in a two-dimensional matrix for controlling a transmitted light amount of the microlenses,
    wherein an optical axes connecting the microlenses and the small light emitting points are inclined to the normal line to the image display device over the entire image display device; and
    wherein an image display consisting of a group of real or false images of the small light-emitting points is formed in an infinite distance or in a position separated by a predetermined distance from an image plane of the image display and laterally displaced in parallel manner by a predetermined amount therefrom.

2. Image display devices comprising a plurality of image display devices according to claim 1 arranged in respective predetermined directions on one plane, wherein inclined straight lines passing through centers of the image display devices pass through a predetermined point distant from the one plane.

3. Image display devices according to claim 2, wherein light emission colors of the small light-emitting points of each of the image display devices are made respectively different; and wherein images of different colors consisting of a group of real or false images or rays of the small light-emitting points are superposed on another plane passing through a predetermined point distant from the one plane to thereby form a color synthesized image display.

4. Image display devices according to claim 2, wherein light emission colors of the small light-emitting points of the image display devices are made respectively different; and wherein light beams or extensions thereof constituting a group of real images or false images of the small light-emitting points are superposed on another plane passing through a predetermined point distant from the one plane and being different from the real or false image plane to thereby form a color synthesized image display.

5. An image display device according to any one of claims 1 to 4, wherein the small light-emitting points are spots of the incident light beam formed by microlenses.

6. A projection-type display apparatus comprising image display devices according to claim 2, wherein a number of the image display devices provided on one plane is three, and colors of the respective illumination means are three primary colors.

7. A projection-type display apparatus comprising image display devices according to claim 2, wherein a number of the image display devices provided on one plane is six, and colors of the respective illumination means are six primary colors.

8. A projection-type display apparatus comprising image display devices according to claim 2, wherein a number of the image display devices provided on one plane is six, colors of illumination means of three image display devices are three primary colors constituting a first image, and colors of illumination means of remaining three image display devices are three primary colors constituting a second image; and wherein the first and second images are mutually superposed.

9. An image display device comprising:
    a microlens element having microlenses arranged in a two-dimensional matrix;
    illumination means of a parallel light beam for illuminating the microlens element from its back side; and
    a barrier element provided between the microlens element and the illumination means or at a surface of the microlens element and having shutters arranged in a two-dimensional matrix for controlling a transmitted light amount of the microlenses,
    wherein optical axes connecting the microlenses and small light-emitting points are inclined to the normal line to the image display device over the entire image display device, and
    wherein an image display consisting of a group of real or false images of the small light-emitting points is formed in an infinite distance or in a position separated by a predetermined distance from an image plane of the image display device and laterally displaced in parallel manner by a predetermined amount therefrom.

10. Image display devices comprising a plurality of image display devices according to claim 9 arranged in respective predetermined directions on one plane, wherein inclined straight lines passing through the centers of each of the image display devices pass through a predetermined point distant from the one plane.

11. Image display devices according to claim 10, wherein colors of the illumination means for the image display devices are made respectively different; and wherein images consisting of a group of real or false images or rays of the small light-emitting points of parallel light beams are superposed on another plane passing through a predetermined point distant from the one plane to thereby form a color synthesized image display.

12. Image display devices according to claim 10, wherein colors of the illumination means for the image display devices are made respectively different; and wherein light beams or extensions thereof constituting a group of real images or false images of the small light-emitting points of parallel light beams are superposed on another plane passing through a predetermined point distant from the one plane and being different from the real or false image plane to form a color synthesized image display.

13. A projection-type display apparatus comprising image display devices according to claim 11, wherein a number of the image display devices provided on one plane is three, and colors of the respective illumination means are three primary colors.

14. A projection-type display apparatus comprising image display devices according to claim 11, wherein a number of the image display devices provided on one plane is six, and the colors of the respective illumination means are six primary colors.

15. A projection-type display apparatus comprising image display devices according to claim 11, wherein a number of the image display devices provided on one plain is six, colors of illumination means of three image display devices are three primary colors constituting a first image, and colors of illumination means of remaining three image display devices are three primary colors constituting a second image; and wherein the first and second images are mutually superposed.

* * * * *

UNITED STATES PATENT AND TRADEMARK OFFICE
CERTIFICATE OF CORRECTION

PATENT NO. : 6,736,515 B2  Page 1 of 1
DATED : May 18, 2004
INVENTOR(S) : Koichi Hara It is certified that error appears in the above-identified patent and that said Letters Patent is hereby corrected as shown below:

<u>Title page,</u>
Item [57], ABSTRACT,
Line 5, "reflection type" should read -- reflection-type --.

<u>Column 2,</u>
Line 36, "are" should read -- is --.

<u>Column 9,</u>
Line 62, "an" should be deleted.

<u>Column 12,</u>
Line 15, "plain" should read -- plane --.

Signed and Sealed this

Fourteenth Day of December, 2004

JON W. DUDAS
*Director of the United States Patent and Trademark Office*